UNITED STATES PATENT OFFICE.

RICHARD GAGGIN, OF ERIE, PENNSYLVANIA.

IMPROVEMENT IN DEODORIZING OILS OBTAINED FROM ACID TAR OF OIL-REFINERIES.

Specification forming part of Letters Patent No. 138,629, dated May 6, 1873; application filed April 3, 1873.

*To all whom it may concern:*

Be it known that I, RICHARD GAGGIN, of the city and county of Erie and State of Pennsylvania, have invented an Improved Method of Deodorizing Oil obtained from the Acid Tar of Oil-Refineries, of which the following is a full, clear, and exact description:

The nature of my invention consists in procuring from the acid tar of petroleum-refineries, by the processes hereinafter described, a fine lubricating oil, and one that is a cheap and exceedingly desirable substitute for linseed-oil in the manufacture of printers' ink. By my system, first of diluting the acid tar, and in then, by a moderate heat, so treating the same or distilling the oil therefrom as to obtain an oil of uniform specific gravity, and one that is entirely free from all light oils which would run through the paper, as well as an oil that in its process of distillation has had abstracted from it all the sulphur and sulphurous gases which these oils generally contain, and the presence of which would render the oils most objectionable for the purposes for which I contemplate using them.

I deodorize the oil by treating the same with the milk of chloride of lime, or chloride of lime dissolved in water at a temperature not higher than about 140°. The great advantage of treating it at about this heat is found in the fact that all danger of the chloride so acting upon the oil as in any manner to injure the same is securely guarded against. After the oil has been thus treated and the limy sediment has been drawn off I introduce a caustic or carbonated alkali, which neutralizes whatever of chlorides or chlorine that may remain.

The construction and operation of my invention are as follows: In a suitable vessel by heat, the use of benzine or a light and cheap oil, or a combination of two, more, or all of these, I dilute the acid tar, and then, by repeated washings with water, free the diluted tar of nearly all its acid, which is readily done, owing to the natural affinity which the acid has for the water. The tar having been thus diluted, and the oil obtained having been comparatively freed of its acid I distill with a moderate heat, and then redistill all the oil that is thrown off from about 35° to the end of the run, (as measured Baumé's hydrometer graduated for petroleum oils.) The second distillation, under a moderate heat, I continue until the specific gravity of the oil has fallen to about 22°, after which all that is drawn off is fit to be used either as a lubricant or as a substitute for linseed-oil in the manufacture of printers' ink; or else when the hydrometer indicates a specific gravity of 24° I cease the distillation and draw off whatever may remain in the still for the same purposes. By either of these processes my own practical experience has fully demonstrated the fact that the oil obtained is not only of sufficient specific gravity, but in it there is an absence of all light oil as well as sulphur and sulphurous gases. While the oil thus obtained is admirably adapted for the purposes stated, still, on account of its offensive smell, it is absolutely necessary that it should be deodorized. This I accomplish by placing the oil in an agitator or treating-tank, and while the same is subjected to a heat of not greater than 140° I introduce the milk of chloride of lime. It is exceedingly important that the degree of heat should not be greater than stated, for if it is and should reach, say, 180°, the chlorine will act too powerfully on the oil, decomposing the same by seizing the hydrogen of the oil, and thus forming a chloride of hydrogen, which mingling with the water of the solution will form hydrochloric acid, while the carbon of the oil would unite with another portion of the chlorine and form a chloride of carbon that would render the oil unfit for either of the purposes for which I contemplate using it. The limy sediment is now drawn off, and I introduce either a caustic or carbonated alkali for the purpose of neutralizing any of the chlorides or chlorine that may remain. The alkaline sediment is then drawn off, and after rinsing with water the process is finished.

What I claim as new, and desire to secure by Letters Patent of the United States, is—

The diluting and distilling of oil from acid tar and then deodorizing the same, in the manner and by the processes substantially as herein described.

In testimony whereof I have signed my name to this specification in the presence of two subscribing witnesses.

RICHARD GAGGIN.

Witnesses:
S. ARNOLD,
R. W. McCONNELL.